United States Patent
Soloway et al.

(10) Patent No.: US 11,109,343 B2
(45) Date of Patent: Aug. 31, 2021

(54) TRANSPORT PROTOCOL USAGE OF CONFIRMABLE VERSUS NON-CONFIRMABLE NOTIFICATIONS BASED ON CRITICALITY OF THE OBSERVATION

(71) Applicant: QUALCOMM Incorporated, San Diego, CA (US)

(72) Inventors: Alan Soloway, Erie, CO (US); Ralph Akram Gholmieh, San Diego, CA (US); Elmira Mazloomian, San Diego, CA (US); Hamza Ijaz Abbasi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/813,305

(22) Filed: Mar. 9, 2020

(65) Prior Publication Data

US 2021/0136724 A1 May 6, 2021

Related U.S. Application Data

(60) Provisional application No. 62/928,153, filed on Oct. 30, 2019.

(51) Int. Cl.
| | | |
|---|---|---|
| *H04W 68/00* | (2009.01) | |
| *H04L 29/06* | (2006.01) | |
| *H04W 4/70* | (2018.01) | |
| *H04L 29/08* | (2006.01) | |
| *H04L 12/58* | (2006.01) | |

(52) U.S. Cl.
CPC .......... *H04W 68/005* (2013.01); *H04L 51/24* (2013.01); *H04L 67/26* (2013.01); *H04L 67/42* (2013.01); *H04W 4/70* (2018.02)

(58) Field of Classification Search
CPC ...... H04W 68/005; H04W 4/70; H04L 51/24; H04L 67/26; H04L 67/42
See application file for complete search history.

(56) References Cited

U.S. PATENT DOCUMENTS

| | | | |
|---|---|---|---|
| 10,009,707 B2 | 6/2018 | Ly et al. | |
| 10,212,261 B2 | 2/2019 | Govindaraju et al. | |
| 10,412,052 B2 | 9/2019 | Bone et al. | |
| 2017/0295503 A1* | 10/2017 | Govindaraju | .......... H04W 4/38 |
| 2019/0208488 A1* | 7/2019 | Thalanany | ........... H04W 60/00 |

FOREIGN PATENT DOCUMENTS

WO 2018106985 A1 6/2018

OTHER PUBLICATIONS

Ansari, Danish et al, Internet of Things (IoT) Protocols: A Brief Exploration of MQTT and CoAP Mar. 2018, vol. 179, pp. 9-14.*
Teklemariam G.K., "CoAP-Based Enablers for Designing Efficient and Reliable Distributed IoT Applications", 2018, 217 pages.

* cited by examiner

*Primary Examiner* — Azizul Choudhury
(74) *Attorney, Agent, or Firm* — The Marbury Law Group, PLLC

(57) ABSTRACT

Various aspects may provide methods for supporting confirmable and non-confirmable notification selection for LwM2M communications that may be performed by a processor of an LwM2M server and/or a processor of an LwM2M client computing device, such as an Internet of Things (IoT) device.

5 Claims, 7 Drawing Sheets

TRANSPORT PROTOCOL USAGE OF CONFIRMABLE VERSUS NON-CONFIRMABLE NOTIFICATIONS BASED ON CRITICALITY OF THE OBSERVATION

RELATED APPLICATIONS

This application claims the benefit of priority to U.S. Provisional Application No. 62/928,153, entitled "Transport Protocol Usage Of Confirmable Versus Non-Confirmable Notifications Based On Criticality Of The Observation" filed Oct. 30, 2019, the entire contents of which are hereby incorporated herein by reference for all purposes.

BACKGROUND

In the Lightweight Machine-to-Machine (LwM2M) protocol defined according to the Open Mobile Alliance (OMA) LwM2M version 1.1 specification, the use of confirmable versus non-confirmable transmissions for notifications is not specified. While LwM2M clients, such as an Internet of Things (IoT) devices, can send confirmable notifications (e.g., notifications sent via a reliable delivery transmission requiring an acknowledgement to be received in response to the notification) or non-confirmable notification (e.g., notifications sent via a best-effort delivery transmission in which an acknowledgement is not required), LwM2M servers currently do not specify how notifications are to be sent. This lack of specification as to the use of confirmable versus non-confirmable transmission for notifications can result in the loss critical notifications to an LwM2M server in current LwM2M systems.

SUMMARY

Various aspects enable confirmable and non-confirmable notification selection for Lightweight Machine-to-Machine (LwM2M) communications.

Various aspects include methods for supporting confirmable and non-confirmable notification selection for LwM2M communications that may be performed by a processor of an LwM2M server and/or a processor of an LwM2M client computing device, such as an Internet of Things (IoT) device.

Some aspects may include an LwM2M client determining whether a default confirmable or non-confirmable setting is present in a server object associated with a LwM2M server, and sending the LwM2M notification as one of a confirmable LwM2M message or a non-confirmable LwM2M message according to the default confirmable or non-confirmable setting in response to determining that the default confirmable or non-confirmable setting is present in the server object associated with the LwM2M server.

Some aspects may further include, in response to determining that no default confirmable or non-confirmable setting is present in the server object, determining whether the observation on which the LwM2M notification is based is a critical observation, sending the LwM2M notification as a confirmable LwM2M message in response to determining that the observation is a critical observation, and sending the LwM2M notification as a non-confirmable LwM2M message in response to determining that the observation is not a critical observation. In some aspects, determining whether the observation on which the LwM2M notification is based is a critical observation may be based at least in part on a type of sensor associated with the observation or a type of the observation.

Further aspects include a computing device, such as an IoT device, having a processor configured with processor-executable instructions to perform operations of any of the LwM2M client methods summarized above. Further aspects include a computing device, such as an IoT device, having means for performing functions of any of the LwM2M client methods summarized above. Further aspects include a non-transitory processor-readable medium having stored thereon processor-executable instructions configured to cause a processor of a computing device, such as an IoT device, to perform operations of any of the LwM2M client methods summarized above. Further aspects include a server having a processor configured with processor-executable instructions to perform operations of any of the LwM2M server methods summarized above. Various aspects include a server having means for performing functions of any of the LwM2M server methods summarized above. Various aspects include a non-transitory processor-readable medium having stored thereon processor-executable instructions configured to cause a processor of a server to perform operations of any of the LwM2M server methods summarized above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

DETAILED DESCRIPTION

Figure 1:
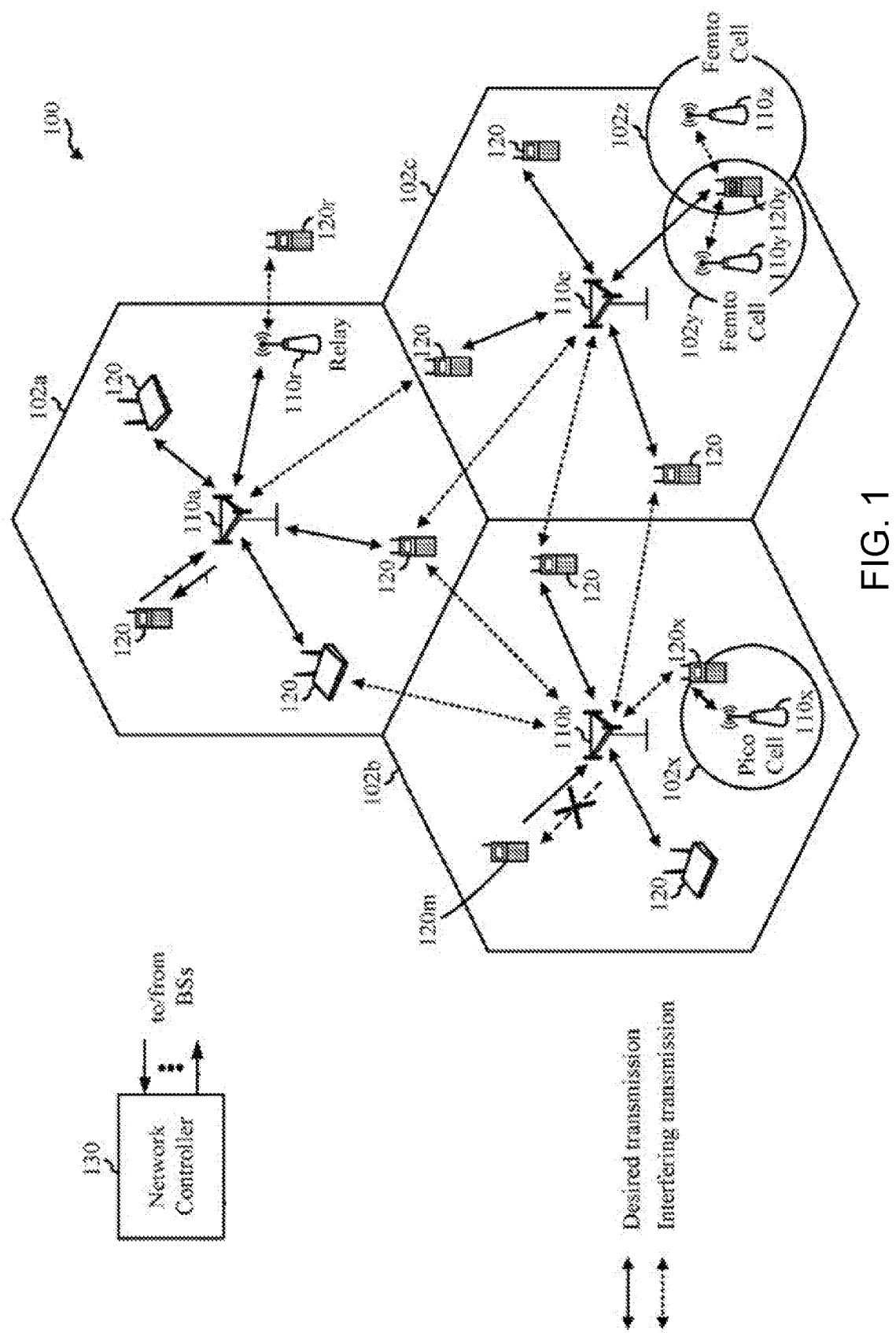
FIG. 1 is a system block diagram conceptually illustrating an example telecommunications system.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments provide methods and computing devices implementing the methods for supporting confirmable and non-confirmable notification selection for Lightweight Machine-to-Machine (LwM2M) communications. A processor of a LwM2M client computing device may determine whether a default confirmable or non-confirmable setting is present in a server object associated with a LwM2M server, and send the LwM2M notification as one of a confirmable LwM2M messages or a non-confirmable LwM2M message according to the default confirmable or non-confirmable setting in response to determining that the default confirmable or non-confirmable setting is present in the server object associated with the LwM2M server. In response to determining that no default confirmable or non-confirmable setting is present in the server object, the processor of the LwM2M client computing device may determine whether the observation on which the LwM2M notification is based is a critical observation, send the LwM2M notification as a confirmable LwM2M message in response to determining that the observation is a critical observation, and send the LwM2M notification as a non-confirmable LwM2M message in response to determining that the observation is not a critical observation.

The term "IoT device" is used herein to refer to any of a variety of devices including a processor and transceiver for communicating with other devices or a network. For ease of description, examples of IoT devices are described as communicating via radio frequency (RF) wireless communication links, but IoT devices may communicate via wired or wireless communication links with another device (or user), for example, as a participant in a communication network, such as the IoT. Such communications may include communications with another wireless device, a base station (including a cellular communication network base station and an IoT base station), an access point (including an IoT access point), or other wireless devices.

Various embodiments may be implemented in any device, system or network that is capable of transmitting and receiving RF signals according to any of the Institute of Electrical and Electronics Engineers (IEEE) 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IoT) network, such as an IEEE 802.15.4 protocol (for example, Thread, ZigBee, and Z-Wave), 6LoWPAN, Bluetooth Low Energy (BLE), LTE Machine-Type Communication (LTE MTC), Narrow Band LTE (NB-LTE), Cellular IoT (CIoT), Narrow Band IoT (NB-IoT), BT Smart, Wi-Fi, LTE-U, LTE-Direct, MuLTEfire, as well as relatively extended-range wide area physical layer interfaces (PHYs) such as Random Phase Multiple Access (RPMA), Ultra Narrow Band (UNB), Low Power Long Range (LoRa), Low Power Long Range Wide Area Network (LoRaWAN), Weightless, or a system utilizing 3G, 4G or 5G, or further implementations thereof, technology.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.).

SOCs may also include software for controlling the integrated resources and processors, as well as for controlling peripheral devices.

The term "system in a package" (SIP) is used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SOCs coupled together via high speed communication circuitry and packaged in close proximity, such as on a single motherboard or in a single IoT device. The proximity of the SOCs facilitates high speed communications and the sharing of memory and resources.

Various embodiments are described herein using the term "server" to refer to any computing device capable of functioning as a server, such as a master exchange server, web server, mail server, document server, content server, or any other type of server. A server may be a dedicated computing device or a computing device including a server module (e.g., running an application that may cause the computing device to operate as a server). A server module (e.g., server application) may be a full function server module, or a light or secondary server module (e.g., light or secondary server application) that is configured to provide synchronization services among the dynamic databases on receiver devices. A light server or secondary server may be a slimmed-down version of server-type functionality that can be implemented on a receiver device thereby enabling it to function as an Internet server (e.g., an enterprise e-mail server) only to the extent necessary to provide the functionality described herein.

In the Lightweight Machine-to-Machine (LwM2M) protocol based systems, such as the LwM2M protocol defined according to the Open Mobile Alliance (OMA) LwM2M version 1.1 specification, notifications from the LwM2M client (e.g., an IoT computing device) to the LwM2M server (e.g., a network side bootstrap or application server) are currently sent either confirmable (e.g., reliable delivery requiring an acknowledgement is required to be received or retransmission will be attempted) or non-confirmable (e.g., best-effort delivery in which an acknowledgement is not required to be received and retransmission will not be reattempted if an acknowledgement is not received). LwM2M systems do not currently dictate how an LwM2M client determines whether to send notifications either confirmable or non-confirmable. This lack of control in current LwM2M systems can result in loss of critical notifications to an LwM2M server if a critical message is sent using best-effort delivery without requiring an acknowledgement of receipt. On the other hand, requiring LwM2M clients to transmit all messages using a confirmable mode may result in unnecessary communications, particularly related to non-important or routine messages.

Various embodiments may enable an LwM2M server to specify a default mode (e.g., confirmable or non-confirmable) for notification delivery by LwM2M clients for particular communications. Various embodiments may enable an LwM2M server to set a confirmable or non-confirmable mode on a per observation basis to override a default mode. In some embodiments, an LwM2M client may determine that a selected mode (e.g., confirmable or non-confirmable) is not appropriate because of contextual information available to the LwM2M client and may override the confirmable versus non-confirmable selected mode based on the contextual information (e.g., change a confirmable setting to a non-confirmable setting, change a non-confirmable setting to a confirmable setting, etc.).

In various embodiments, a bootstrap server in an LwM2M system sends a server object for an LwM2M server to an LwM2M client that indicates the LwM2M server with which the LwM2M client will communicate. The server object sent by the boot strap server may also indicate a default confirmable or non-confirmable setting for notifications that will be sent to the LwM2M server associated with the LwM2M server object. Specifically, the LwM2M server object may include a setting or indication that LwM2M notifications are to be sent confirmable by default (i.e., requesting an acknowledgement message) or non-confirmable by default (i.e., not requesting an acknowledgement message). The LwM2M client may implement the LwM2M server object and follow the default confirmable or non-confirmable setting when sending notifications to the LwM2M server unless the confirmable or non-confirmable setting is changed by the LwM2M server.

In various embodiments, an LwM2M server may send an observation message to an LwM2M client computing device indicating that LwM2M notifications from the LwM2M client computing device associated with the LwM2M observation message are to be sent confirmable. In various embodiments, an LwM2M server may send an observation message to an LwM2M client computing device indicating that LwM2M notifications from the LwM2M client computing device associated with the LwM2M observation message are to be sent non-confirmable. In this manner, the LwM2M server may control how notifications are to be sent on a per observation basis. In some embodiments, an LwM2M server may determine whether the observation associated with an observation message is a critical observation or a non-critical observation, and set the state of the observation message element indicating confirmable or non-confirmable notifications are to be sent based on this determination. For example, an LwM2M server may indicate in the observation message for a critical observation that confirmable notifications are required, and may indicate in the observation message for a non-critical observation that non-confirmable notifications are required. In some embodiments, determining whether an observation indicated in an LwM2M observation message is a critical observation may be based at least in part on a type of sensor associated with an LwM2M observation message (e.g., the sensor being a safety type sensor, such as a fire sensor, etc.), a type of the LwM2M client computing device (e.g., the LwM2M client computing device being a safety type device, such as a smoke detector, etc.), or a type of LwM2M notification to be sent in response to the LwM2M observation message (e.g., the type of the LwM2M notification being a safety notification, such as a fire notification, etc.).

In various embodiments, an LwM2M client computing device may apply a tiered approach to determining whether or not to send notifications to an LwM2M server as confirmable notifications or non-confirmable notifications. In some embodiments, the LwM2M client computing device may determine whether an observation associated with the LwM2M notification (e.g., the observation received from an LwM2M server that directed the LwM2M client computing device to observer a resource or condition) indicates a setting for notifications to be confirmable or non-confirmable. In response to the setting indication being present in the original observation message, the LwM2M client computing device may send the LwM2M notification as confirmable or non-confirmable according to the indicated setting. In some embodiments, the setting indication may not be present in the original observation message, and in response to such observation messages, the LwM2M client computing device may determine whether the server object for the destination LwM2M server for the LwM2M notification indicates a default setting for confirmable or non-confirmable transmissions. In response to the setting indication being present in the server object, the LwM2M client computing device may send the LwM2M notification as confirmable or non-confirmable according to the default setting in the server object. In some embodiments, the server object may not indicate a default setting, in which case the LwM2M client computing device may determine whether the observation on which the LwM2M notification is based is a critical observation. In some embodiments, the LwM2M client computing device may determine whether the observation that is the subject of an LwM2M notification is a critical observation based at least in part on a type of sensor associated with the observation (e.g., the sensor being a safety type sensor, such as a fire sensor, etc.) or a type of the observation (e.g., the type of observation being a safety observation, such as a fire observation).

FIG. 1 illustrates an example wireless network 100, such as a new radio (NR) or 5G network, in which embodiments of the present disclosure may be performed. For example, an IoT device equipped with the system in a package (SIP) 200 illustrated in FIG. 2 may include a 5G modem processor that is configured to send and receive information via the wireless network 100.

In the example illustrated in FIG. 1, the wireless network 100 includes a number of base stations 110 and other network entities. A base station may be a station that communicates with wireless devices including IoT devices. Each base station 110 may provide communication coverage for a particular geographic area. In 3rd Generation Partnership Project (3GPP), the term "cell" can refer to a coverage area of a Node B and/or a Node B subsystem serving this coverage area, depending on the context in which the term is used. In new radio (NR) or Fifth Generation (5G) network systems, the term "cell" and eNB, Node B, 5G NB, access point (AP), NR base station, NR base station, or transmission and reception point (TRP) may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. Wireless networks 100 supporting IoT device communications may use or support narrowband-Internet of Thing (NB-IoT), Global System for Mobile Communications (GSM), and Voice over Long Term Evolution (VoLTE) RATs as well as other RATs (e.g., 5G).

A base station may provide communication coverage for a macro cell, a pico cell, a femto cell, and/or other types of cell. A macro cell may cover a relatively large geographic area (e.g., several kilometers in radius) and may allow unrestricted access by IoT devices with service subscription. A pico cell may cover a relatively small geographic area and may allow unrestricted access by IoT devices with service subscription. A femto cell may cover a relatively small geographic area (e.g., a home) and may allow restricted access by IoT devices having association with the femto cell (e.g., IoT devices in a Closed Subscriber Group (CSG), IoT devices for users in the home, etc.). A base station for a macro cell may be referred to as a macro base station. A base station for a pico cell may be referred to as a pico base station. A base station for a femto cell may be referred to as a femto base station or a home base station. In the example shown in FIG. 1, the base stations 110a, 110b and 110c may be macro base stations for the macro cells 102a, 102b and 102c, respectively. The base station 110x may be a pico base station for a pico cell 102x. The base stations 110y and 110z may be femto base station for the femto cells 102y and 102z, respectively. A base station may support one or multiple (e.g., three) cells. Further, base stations may support communications on multiple networks using multiple RATs, such as NB-IoT, GSM, and VoLTE.

The wireless network 100 may also include relay stations. A relay station is a station that receives a transmission of data and/or other information from an upstream station (e.g., a base station or an IoT device) and sends a transmission of the data and/or other information to a downstream station (e.g., an IoT device or a base station). A relay station may also be a wireless device that relays transmissions for other wireless devices including IoT devices. In the example shown in FIG. 1, a relay station 110r may communicate with the base station 110a and an IoT device 120r in order to facilitate communication between the base station 110a and the IoT device 120r. A relay station may also be referred to as a relay base station, a relay, etc. Further, relay stations may support communications on multiple networks using multiple RATs, such as NB-IoT, GSM, and VoLTE.

The wireless network 100 may be a heterogeneous network that includes base stations of different types, e.g., macro base station, pico base station, femto base station, relays, etc. These different types of base stations may have different transmit power levels, different coverage areas, and different impact on interference in the wireless network 100. For example, macro base station may have a high transmit power level (e.g., 20 Watts) whereas pico base station, femto base station, and relays may have a lower transmit power level (e.g., 1 Watt).

The wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for both synchronous and asynchronous operations.

A network controller 130 may be coupled to a set of base stations and provide coordination and control for these base stations. The network controller 130 may communicate with the base stations 110 via a backhaul. The base stations 110 may also communicate with one another, e.g., directly or indirectly via wireless or wireline backhaul.

The IoT devices 120 (e.g., 120x, 120y, etc.) may be dispersed throughout the wireless network 100, and each IoT device may be stationary or mobile. Some IoT devices may be considered evolved or machine-type communication (MTC) devices or evolved MTC (eMTC) devices. MTC and eMTC IoT devices include, for example, robots, drones, remote devices, sensors, meters, monitors, location tags, etc., that may communicate with a base station, another device (e.g., remote device), or some other entity. A wireless node may provide, for example, connectivity for, or to, a network (e.g., a wide area network such as Internet or a cellular network) via a wired or wireless communication link.

In FIG. 1, a solid line with double arrows indicates desired transmissions between an IoT device and a serving base station, which is a base station designated to serve the IoT device on the downlink and/or uplink. A dashed line with double arrows indicates interfering transmissions between the IoT device and a base station.

Certain wireless networks (e.g., Long Term Evolution (LTE)) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block") may be 12 subcarriers (or 180 kHz). Consequently, the nominal full frame transfer (FFT) size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

A NR base station (e.g., eNB, 5G Node B, Node B, transmission reception point (TRP), access point (AP)) may correspond to one or multiple base stations. NR cells may be configured as access cell (ACells) or data only cells (DCells). For example, the radio access network (RAN) (e.g., a central unit or distributed unit) may configure the cells. DCells may be cells used for carrier aggregation or dual connectivity, but not used for initial access, cell selection/reselection, or handover. NR base stations may transmit downlink signals to IoT devices indicating the cell type. Based on the cell type indication, the IoT device may communicate with the NR base station. For example, the IoT device may determine NR base stations to consider for cell selection, access, handover (HO), and/or measurement based on the indicated cell type.

Figure 2:
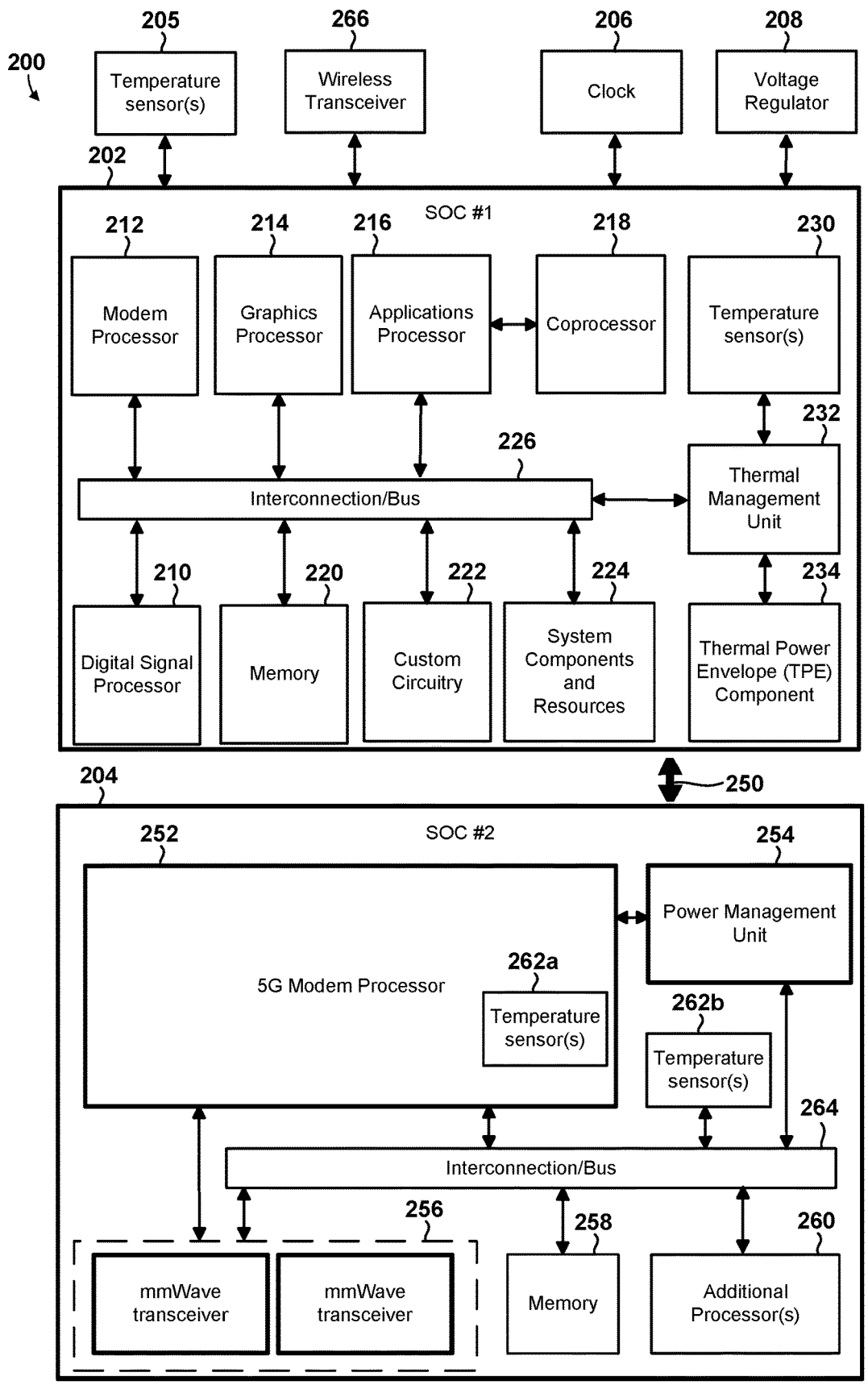
FIG. 2 is a component block diagram illustrating components of example IoT devices suitable for implementing various embodiments of the present disclosure.

Various embodiments may be implemented on IoT devices equipped with any of a number of single processor and multiprocessor computer systems, including a systemon-chip (SOC) or system in a package (SIP). FIG. 2 illustrates an example computing system or SIP 200 architecture that may be used in IoT devices (e.g., the IoT devices 120) implementing the various embodiments. With reference to FIGS. 1 and 2, the SIP 200 may provide all of the processing, data storage and communication capabilities required to support the mission or functionality of a given IoT device. The same SIP 200 may be used in a variety of different types of IoT devices (e.g., smart meters, smart appliances, sensors, etc.) with device-specific functionality provided via programming of one or more processors within the SIP. Further, the SIP 200 is an example of components that may be implemented in a SIP used in IoT devices and more or fewer components may be included in a SIP used in IoT devices without departing from the scope of the claims.

The example SIP 200 illustrated in FIG. 2 includes two SOCs 202, 204, a temperature sensor 205, a wireless transceiver 266, a clock 206, and a voltage regulator 208. In some embodiments, the first SOC 202 operates as central processing unit (CPU) of the IoT device that carries out the instructions of software application programs by performing the arithmetic, logical, control and input/output (I/O) operations specified by the instructions. In some embodiments, the second SOC 204 may operate as a specialized processing unit. For example, the second SOC 204 may operate as a specialized 5G processing unit responsible for managing high volume, high speed (e.g., 5 Gbps, etc.), and/or very high frequency short wave length (e.g., 28 GHz mmWave spectrum, etc.) communications.

In the example illustrated in FIG. 2, the first SOC 202 includes a digital signal processor (DSP) 210, a modem processor 212, a graphics processor 214, an application processor 216, one or more coprocessors 218 (e.g., vector co-processor) connected to one or more of the processors, memory 220, custom circuitry 222, system components and resources 224, an interconnection/bus module 226, one or more temperature sensors 230, a thermal management unit 232, and a thermal power envelope (TPE) component 234. The second SOC 204 includes a 5G modem processor 252, a power management unit 254, temperature sensors 262a 262b, an interconnection/bus module 264, a plurality of mmWave transceivers 256, memory 258, and various additional processors 260, such as an applications processor, packet processor, etc.

Each processor 210, 212, 214, 216, 218, 252, 260 may include one or more cores, and each processor/core may perform operations independent of the other processors/cores. For example, the first SOC 202 may include a processor that executes a first type of operating system (e.g., FreeBSD, LINUX, OS X, etc.) and a processor that executes a second type of operating system (e.g., MICROSOFT WINDOWS 10). In addition, any or all of the processors 210, 212, 214, 216, 218, 252, 260 may be included as part of a processor cluster architecture (e.g., a synchronous processor cluster architecture, an asynchronous or heterogeneous processor cluster architecture, etc.).

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on an IoT device. The system components and resources 224 and/or custom circuitry 222 may also include circuitry to interface with peripheral devices, such as cameras, electronic displays, wireless communication devices, external memory chips, etc.

The first and second SOC 202, 204 may communicate via an interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processors 252, 260 may be interconnected to the power management unit 254, the mmWave transceivers 256, memory 258, and various additional processors 260 via the interconnection/bus module 264. The interconnection/bus module 226, 250, 264 may include an array of reconfigurable logic gates and/or implement a bus architecture (e.g., CoreConnect, AMBA, etc.). Communications may be provided by advanced interconnects, such as high-performance networks-on chip (NoCs).

The first and/or second SOCs 202, 204 may further include an input/output module (not illustrated) for communicating with resources external to the SOC, such as a clock 206 and a voltage regulator 208. Resources external to the SOC (e.g., clock 206, voltage regulator 208) may be shared by two or more of the internal SOC processors/cores.

Figure 3:
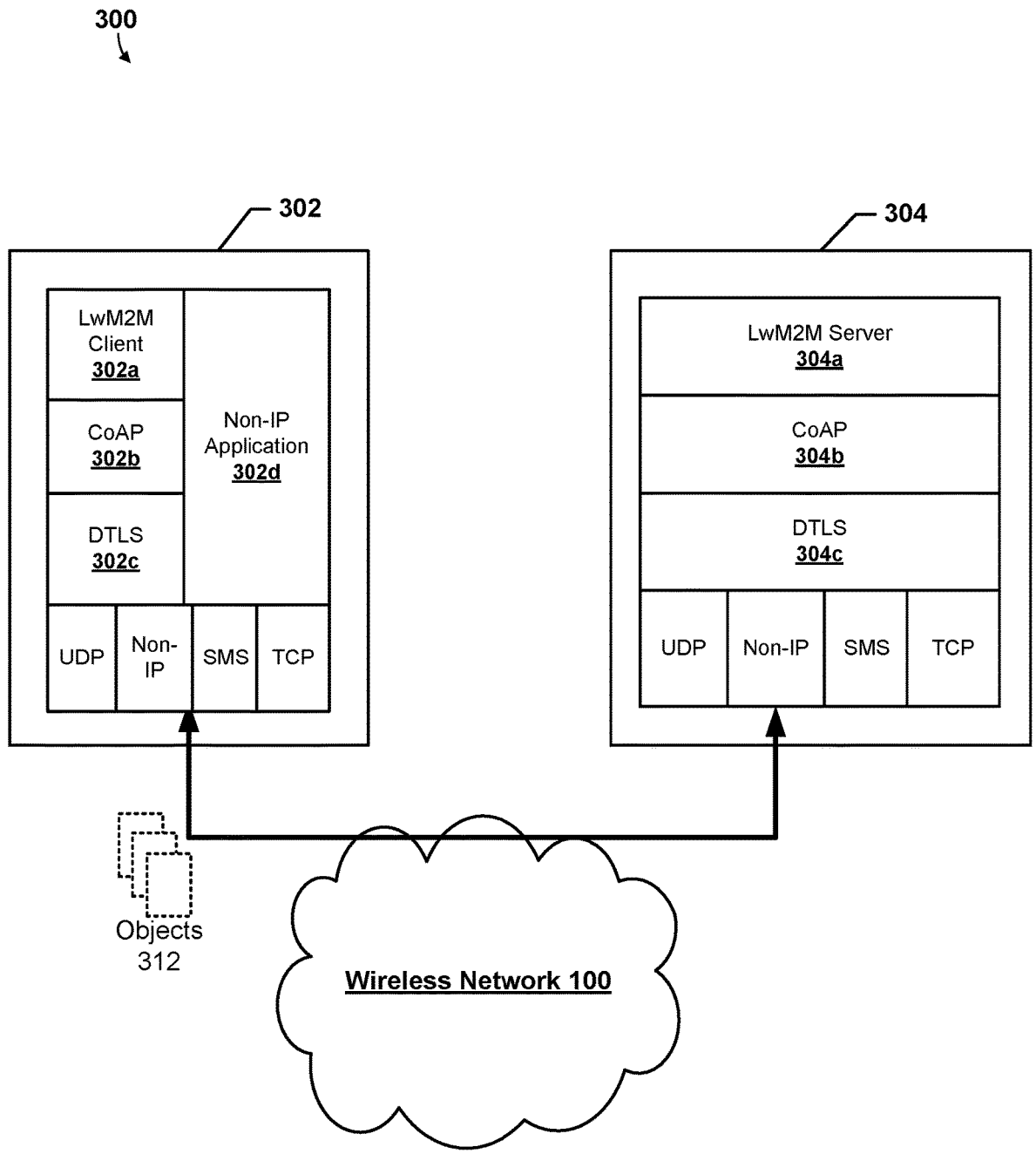
FIG. 3 is a block diagram illustrating an example data call architecture suitable for use with various embodiments.

FIG. 3 illustrates an example data call architecture 300 suitable for use with various embodiments. With reference to FIGS. 1-3, the architecture 300 shows an example of a data call between an IoT device 302 (e.g., IoT devices 120) and a server 304. The architecture 300 is discussed with reference to LwM2M, but LwM2M is merely an example of an application of a data call used to illustrate aspects of the architecture 300. Other protocols, such as other OMA protocols may be used to establish a data call and the architecture 300 may apply to non-LwM2M data calls. The IoT device 302 and the server 304 may be configured to communicate using one or more communication protocols, such as the User Datagram Protocol (UDP), Short Message Service (SMS), Non-Internet Protocol (Non-IP) protocols, Transmission Control Protocol (TCP), etc. As an example, the IoT device 302 may be an LwM2M client device. As an example, the server 304 may be an LwM2M server, such as a bootstrap server as defined by LwM2M or an LwM2M server that is not a bootstrap server. The server 304 may be an application server. While illustrated as in communication with one server 304, traffic from the IoT device 302 may be routed to multiple servers each identified by their own respective destination port by the wireless network 100.

In some embodiments, the IoT device 302 may be configured with an LwM2M client 302a that uses the LwM2M device management protocol. The LwM2M device management protocol defines an extensible resource and data model. The LwM2M client 302a may employ a service-layer transfer protocol such as Constrained Application Protocol (CoAP) 302b to enable, among other things secure data transfer. The IoT device 302 may employ a communication security protocol such as Datagram Transport Layer Security (DTLS) 302c. DTLS in particular may provide security for datagram-based applications. Such applications may include one or more of UDP applications, SMS applications, Non-IP applications, TCP applications, etc. The various applications may structure communications for transmitting data from and/or receiving data at the IoT device 302 via the wireless network 100.

In some embodiments, the server 304 may be configured with an LwM2M server 304a, a transfer protocol such as CoAP 304b, and a security protocol such as DTLS 304c. The application server 304 may be configured to utilize a variety of communication protocols, such as UDP, SMS, TCP, non-IP protocol and the like.

In various embodiments, an LwM2M server 304a may send an observation request to an LwM2M client 302a. The observation request may be an indication for the LwM2M client 302a to observe a resource or condition of the IoT device 302. In some embodiments, an observation request may be an observation message sent from the LwM2M server 304a to the LwM2M client 302a. The resource or condition of the IoT device 302 may be an LwM2M notification or reading detected by the IoT device 302 (e.g., by a sensor of the IoT device 302) or reported to the IoT device 302 (e.g., by another device connected to the IoT device 302). Examples of notifications or readings may include a fire alarm activation notification, a smoke detector sensor reading, a temperature sensor reading, etc. The observation request may indicate an LwM2M notification or reading threshold to which the LwM2M client 302a is to compare observations or readings to determine whether to report the observed resource, condition or sensor data back to the LwM2M server 304a. Additionally, or alternatively, the observation request may indicate a periodicity for reporting observed resources back to the LwM2M server 304a. Upon receiving an observation request (e.g., an observation message) the LwM2M client 302a may observe resources or conditions of the IoT device 302 according to the observation request (e.g., the observation message) and send an LwM2M notification to the LwM2M server 304a as required by the settings (e.g., thresholds, periodicities, etc.) in the observation request (e.g., an observation message). The LwM2M client 302a may send an LwM2M notification to the LwM2M server 304a via the wireless network 100. The LwM2M notifications may be sent either confirmable (e.g., reliable delivery requiring an acknowledgement is required to be received or retransmission will be attempted) or non-confirmable (e.g., best-effort delivery in which an acknowledgement is not required to be received and retransmission will not be reattempted if an acknowledgement is not received).

Figure 4:
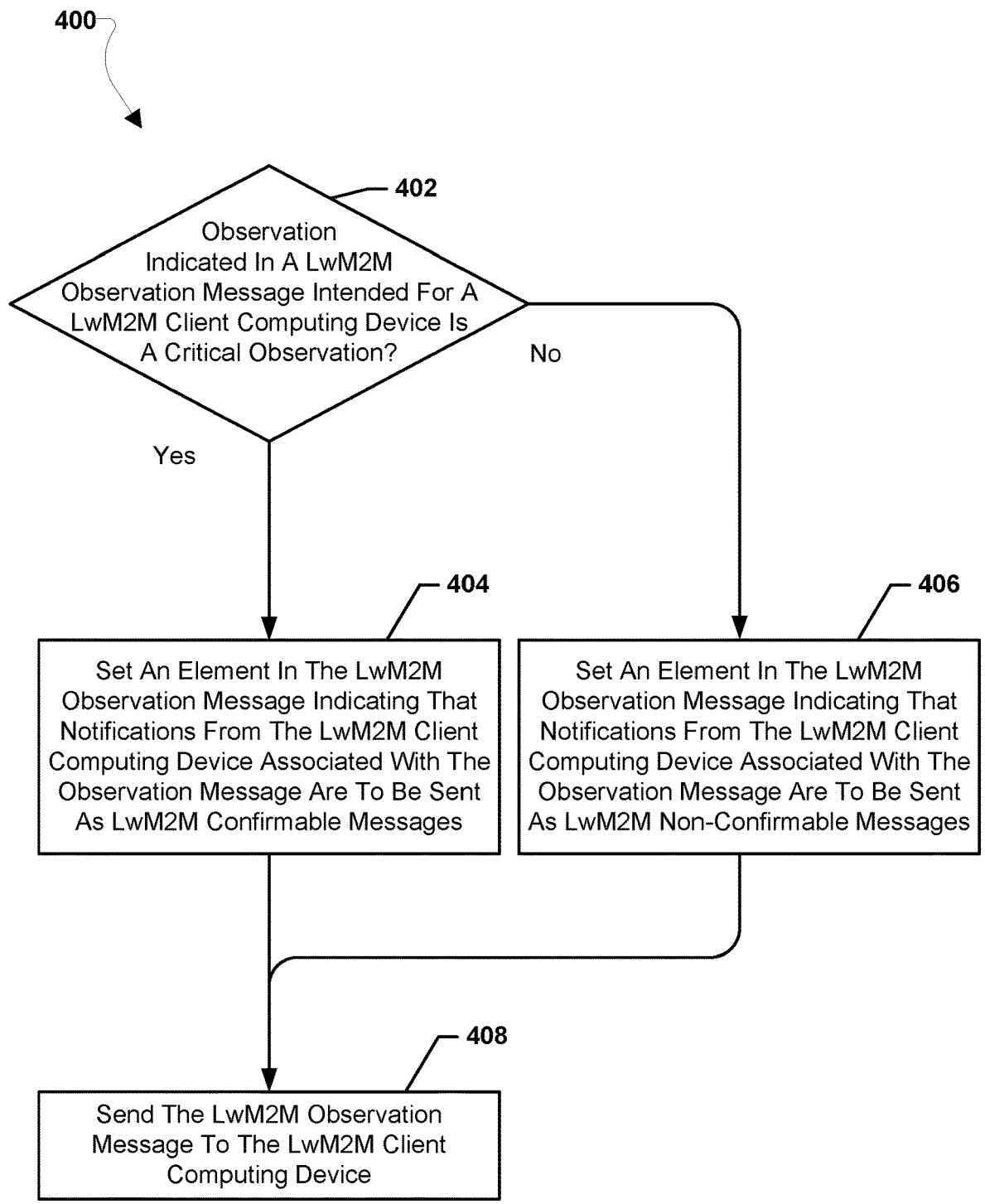
FIG. 4 is a process flow diagram illustrating an example method that may be performed by an LwM2M server for supporting confirmable and non-confirmable notification selection for LwM2M communications in accordance with various embodiments of the present disclosure.

FIG. 4 illustrates a method 400 that may be performed by an LwM2M server for supporting confirmable and non-confirmable notification selection for LwM2M communications according to some embodiments. With reference to FIGS. 1-4, the method 400 may be implemented in hardware components and/or software components of a network element (e.g., a server or other type device, such as network controller 130, etc.) functioning as an LwM2M server (e.g., 304a), the operations of which may be controlled by one or more processors. For ease of reference, the hardware performing the method 400 is referred to generally herein as a "processor."

In determination block 402, the processor may determine whether an observation indicated in an LwM2M observation message intended for an LwM2M client computing device is a "critical observation." For the purpose of this disclosure, the term "critical observation" is used herein to refer to an observation for which delivery of associated notifications is determined by a processor based on some criteria to be important enough to warrant the additional communication and processing overhead of the LwM2M client computing device indicating that the LwM2M notification should be acknowledged and retransmitting the LwM2M notification until such an acknowledgement is received by the LwM2M client computing device.

In some embodiments, the processor may determine whether an observation indicated in the LwM2M observation message is a critical observation in determination block 402 based at least in part on a type of sensor associated with an LwM2M observation message (e.g., the sensor being a safety type sensor, such as a fire sensor, etc.), a type of the LwM2M client computing device (e.g., the LwM2M client computing device being a safety type device, such as a smoke detector, etc.), or a type of LwM2M notification to be sent in response to the LwM2M observation message (e.g., the type of the LwM2M notification being a safety notification, such as a fire notification, etc.). In some embodiments, criteria not directly related to the observation message may be considered by the processor in determination block 402, such as time of day, day of year, weather conditions or forecasts, data received from other sensors or IoT devices, external events triggering the LwM2M observation message, data requests received from other computing devices, etc. In some embodiments, the processor may determine whether an observation indicated in the LwM2M observation message is a critical observation in determination block 402 based on whether the observation message satisfies predefined criteria associated with the type of sensor, type of the LwM2M client computing device, or type of LwM2M notification. In some embodiments, such predefined criteria may be defined in a data table, and determining whether an observation indicated in the LwM2M observation message is a critical observation in determination block 402 may be accomplished using a table lookup process.

In some cases, the LwM2M observation message may be generated by the LwM2M server. In some cases, the LwM2M observation message may be generated by another computing device or network element and received by the LwM2M server for delivery to the LwM2M client computing device. In cases in which the LwM2M observation message is received from another computing device, the processor may determine whether an observation indicated in the LwM2M observation message is a critical observation based at least in part on a source of the received observation message and/or a content of the received observation message.

In response to determining that the observation is critical (i.e., determination block 402="Yes"), the processor may set an element in the LwM2M observation message indicating that LwM2M notifications from the LwM2M client computing device associated with the LwM2M observation message are to be sent confirmable in block 404.

In response to determining that the observation is not critical (i.e., determination block 402="No"), the processor may set an element in the LwM2M observation message indicating that LwM2M notifications from the LwM2M client computing device associated with the LwM2M observation message are to be sent non-confirmable in block 406.

In block 408, the processor may send the LwM2M observation message to the LwM2M client computing device.

Figure 5:
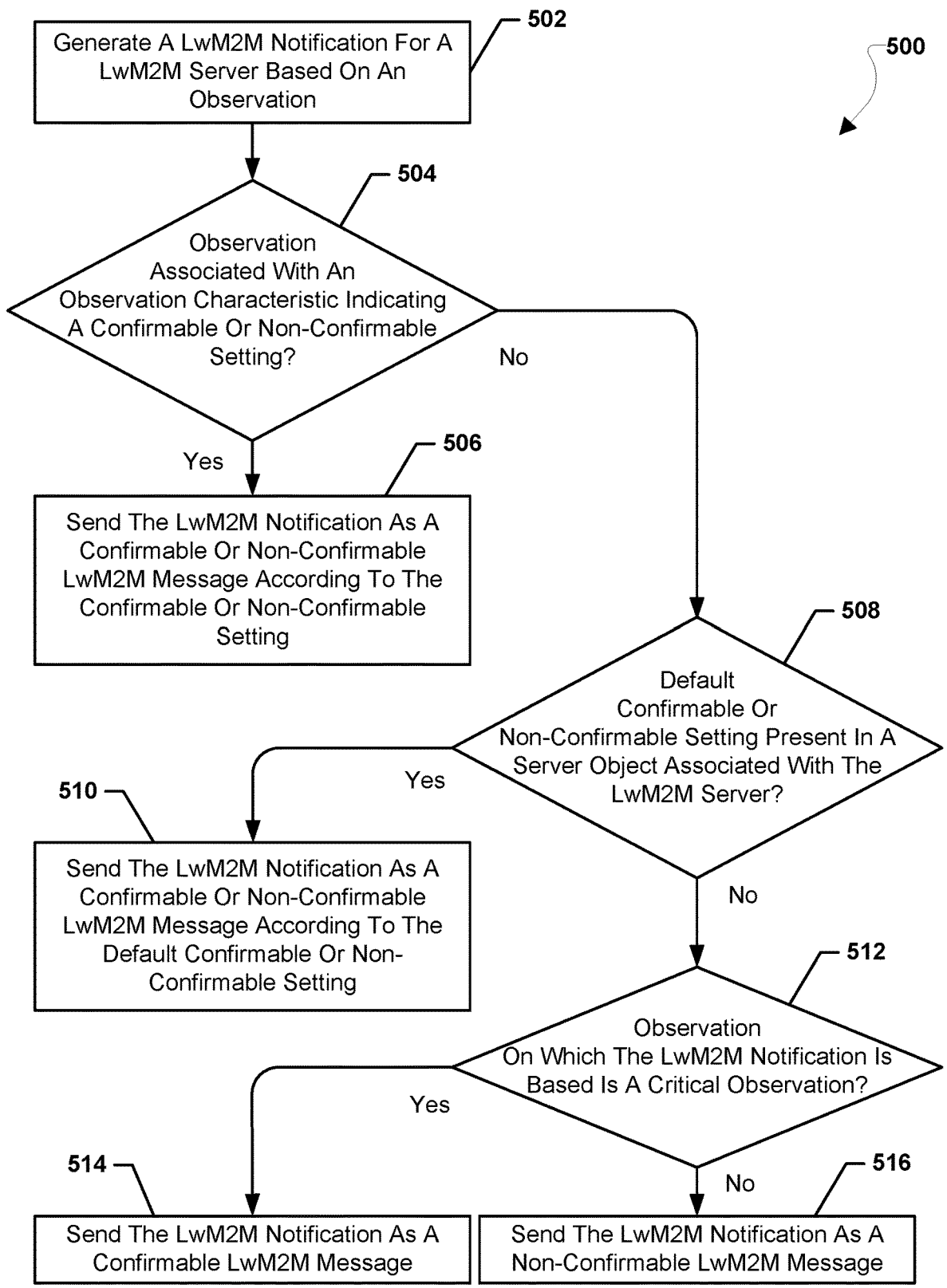
FIG. 5 is a process flow diagram illustrating an example method that may be performed by an LwM2M client computing device for supporting confirmable and non-confirmable notification selection for LwM2M communications in accordance with various embodiments of the present disclosure.

FIG. 5 illustrates a method 500 that may be performed by an LwM2M client computing device for supporting confirmable and non-confirmable notification selection for LwM2M communications according to some embodiments. With reference to FIGS. 1-5, the method 500 may be implemented in hardware components and/or software components of the IoT device, such as an LwM2M client computing device (e.g., 120, 302, etc.), the operations of which may be controlled by one or more processors, such as a modem processor (e.g., 212 or 252), which may be a part of an SIP (e.g., 200) and perform some operations in conjunction with other processors within the SIP. For ease of reference, the hardware performing the method 500 is referred to generally herein as a "processor." Operations of the method 500 may be performed by an LwM2M client computing device in response to an LwM2M server performing the operations of method 400 (FIG. 4).

In block 502, the processor may generate an LwM2M notification for an LwM2M server based on an observation by the IoT device. In some embodiments, the observation may be of a resource or condition of or related to the IoT device. In some embodiments, the observation may be data obtained by the IoT device, such as from a sensor within or coupled to the IoT device. In some embodiments, the observation may have been initiated in response to an observation message received from an LwM2M server, such as an observation message sent according to the operations of the method 500 as described (FIG. 5). For example, an observation message received by the IoT device may prompt or direct the IoT device to report data from a sensor of or connected to the device, and in response, the IoT device may activate or sample the sensor to obtain a measurement, reading or other data (i.e., an observation), and generate an LwM2M notification (i.e., an LwM2M message) to communicate the information obtained from this observation to the LwM2M server.

In determination block 504, the processor may determine whether the observation or the information obtained from this observation complies with or matches an observation characteristic associated with a confirmable or non-confirmable notification setting. For example, the observation message received from an LwM2M server that prompted or directed the LwM2M client computing device to make the observation may indicate a setting for responsive notifications to be sent as confirmable or non-confirmable notifications. In some embodiments, the confirmable or non-confirmable notification setting indication may not be present in the original observation message.

In response to determining that the observation is associated with a confirmable or non-confirmable setting (i.e., determination block 504="Yes"), the processor may send the LwM2M notification as a confirmable or non-confirmable LwM2M message according to the confirmable or non-confirmable setting in block 506.

In response to determining that the observation is not associated with a confirmable or non-confirmable setting (i.e., determination block 504="No"), the processor may determine whether a default confirmable or non-confirmable setting is present in a server object associated with the LwM2M server in determination block 508. In some embodiments, the server object for the destination LwM2M server for the LwM2M notification may indicate a default setting for confirmable or non-confirmable transmissions, and when there is no setting indication in the observation message, the LwM2M client computing device may follow the default setting indicated in the server object. In some embodiments, the server object may not indicate a default setting.

In response to determining that a default confirmable or non-confirmable setting is present in the server object (i.e., determination block 508="Yes"), the processor may send the LwM2M notification as a confirmable or non-confirmable LwM2M message according to that default confirmable or non-confirmable setting in block 510.

In response to determining that a default confirmable or non-confirmable setting is not present in the server object (i.e., determination block 508="No"), the processor may determine whether the observation on which the LwM2M notification is based is a critical observation in determination block 512. Thus, when neither of the bootstrap server or the LwM2M server have indicated a default or particular default confirmable or non-confirmable setting for notifications, the processor may perform operations to decide whether to send a confirmable notification or a non-confirmable notification based upon the type or content of the LwM2M notification (i.e., not exclusively confirmable notification or non-confirmable). Whether the observation on which the LwM2M notification is based is a critical observation may be based at least in part on a type of sensor associated with the observation (e.g., the sensor being a safety type sensor, such as a fire sensor, etc.) or a type of the observation (e.g., the type of observation being a safety observation, such as a fire observation). In some embodiments, other information known to the LwM2M client computing device and criteria not directly related to the observation may be considered by the processor in determination block 512, such as time of day, day of year, etc. In some embodiments, the processor may determine whether an observation is a critical observation in determination block 512 based on whether the observation satisfies predefined criteria associated with the type of sensor, or type of LwM2M notification. In some embodiments, such predefined criteria may be defined in a data table, and determining whether an observation indicated in the LwM2M observation message is a critical observation in determination block 512 may be accomplished using a table lookup process.

In response to determining that the observation is critical (i.e., determination block 512="Yes"), the processor may send the LwM2M notification as a confirmable LwM2M message in block 514. In doing so, the LwM2M notification message will include a request or indication (e.g., a particular bit set in the message header) for the LwM2M server to send an acknowledgement (e.g., an ACK message) upon successfully receiving and decoding the LwM2M notification. Also as part of block 514, the processor may retransmit the LwM2M notification as a confirmable LwM2M message if no acknowledgement is received within the period of time defined for confirmable LwM2M message in the LwM2M protocol, and continuing to do so until an acknowledgement is received.

In response to determining that the observation is not critical (i.e., determination block 512="No"), the processor may send the LwM2M notification as a non-confirmable LwM2M message in block 516.

Figure 6:
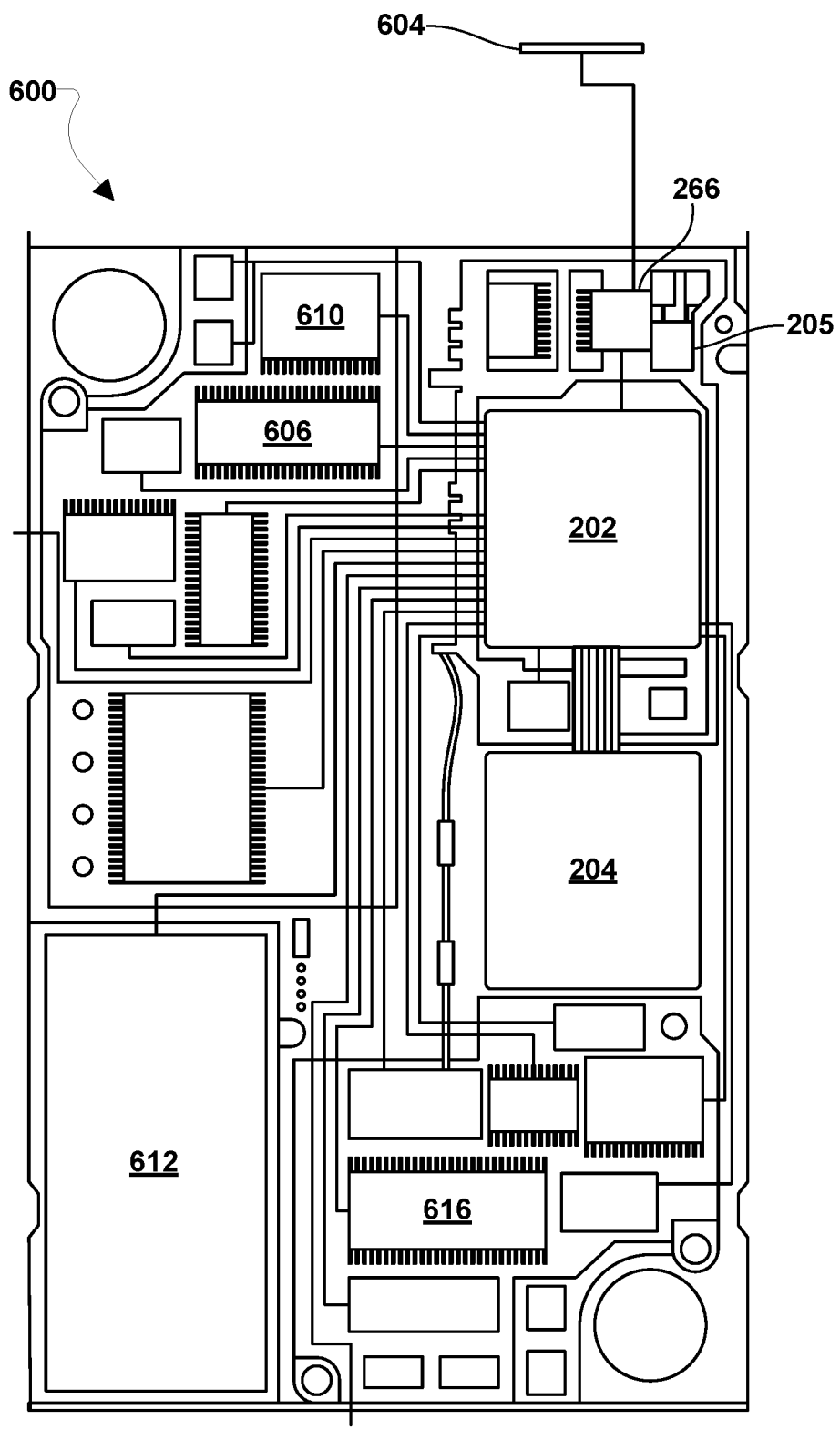
FIG. 6 is a component block diagram of an IoT device suitable for use in accordance with various embodiments of the present disclosure.

Various embodiments (including, but not limited to, embodiments discussed above with reference to FIGS. 1-5) may be implemented on a variety of IoT devices, particularly an LwM2M device, an example in the form of a circuit board for use in a device is illustrated in FIG. 6. With reference to FIGS. 1-6, an IoT device 600 may include a first SOC 202 (e.g., a SOC-CPU) coupled to a second SOC 204 (e.g., a 5G capable SOC) and a temperature sensor 205. The first and second SOCs 202, 204 may be coupled to internal memory 606. Additionally, the IoT device 600 may include or be coupled to an antenna 604 for sending and receiving wireless signals from a wireless transceiver 266 or within the second SOC 204. The antenna 604 and wireless transceiver 266 and/or second SOC 204 may support communications using various RATs, including NB-IoT, CIoT, GSM, and/or VoLTE.

An IoT device 600 may also include a sound encoding/decoding (CODEC) circuit 610, which digitizes sound received from a microphone into data packets suitable for wireless transmission and decodes received sound data packets to generate analog signals that are provided to a speaker to generate sound in support of voice or VoLTE calls. Also, one or more of the processors in the first and second SOCs 202, 204, wireless transceiver 266 and CODEC 610 may include a digital signal processor (DSP) circuit (not shown separately).

Some IoT devices may include an internal power source, such as a battery 612 configured to power the SOCs and transceiver(s). Such IoT devices may include power management components 616 to manage charging of the battery 612.

Figure 7:
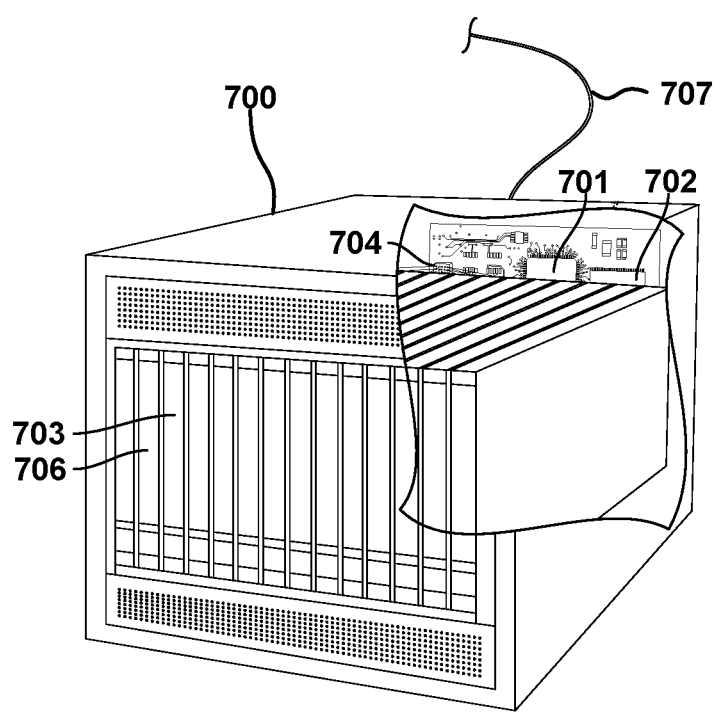
FIG. 7 is a component diagram of an example server suitable for use with the various embodiments.

The various embodiments (including, but not limited to, embodiments discussed above with reference to FIGS. 1-5) may also be implemented on any of a variety of commercially available server devices, such as the server 700 illustrated in FIG. 7. With reference to FIGS. 1-7, such a server 700 typically includes a processor 701 coupled to volatile memory 702 and a large capacity nonvolatile memory, such as a disk drive 703. The server 700 may also include a floppy disc drive, compact disc (CD) or digital versatile disc (DVD) drive 706 coupled to the processor 701. The server 700 may also include one or more network transceivers 704, such as a network access port, coupled to the processor 701 for establishing network interface connections with a communication network 707, such as a local area network coupled to other announcement system computers and servers, the Internet, the public switched telephone network, and/or a cellular network (e.g., CDMA, TDMA, GSM, PCS, 3G, 4G, 5G, LTE, or any other type of cellular network).

The processors used in any embodiments may be any programmable microprocessor, microcomputer or multiple processor chip or chips that can be configured by software instructions (applications) to perform a variety of functions, including the functions of the various embodiments described in this application. In some IoT devices, multiple processors may be provided, such as one processor dedicated to wireless communication functions (e.g., in SOC 204) and one processor dedicated to running other applications (e.g., in SOC 202). Typically, software applications may be stored in the internal memory before they are accessed and loaded into a processor. The processor may include internal memory sufficient to store the application software instructions.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on an IoT device and the IoT device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general packet radio service (GPRS), code division multiple access (CDMA) systems (e.g., cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iden). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods may be substituted for or combined with one or more operations of the methods.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method for supporting confirmable and non-confirmable notification selection for Lightweight Machine-to-Machine (LwM2M) communications, comprising:

receiving, by a processor of a LwM2M client computing device, a server object associated with a LwM2M server, wherein the server object associated with the LwM2M server includes a default confirmable or non-confirmable setting that overrides a confirmable or non-confirmable mode of the LwM2M client computing device for communication with the LwM2M server; and sending, by the processor of the LwM2M client computing device, a LwM2M notification as one of a confirmable LwM2M messages or a non-confirmable LwM2M message according to the default confirmable or non-confirmable setting in the server object associated with the LwM2M server.

2. A Lightweight Machine-to-Machine (LwM2M) client computing device, comprising a processor configured to:

receive a server object associated with the LwM2M server, wherein the server object associated with the LwM2M server includes a default confirmable or non-confirmable setting that overrides a confirmable or non-confirmable mode of the LwM2M client computing device for communication with the LwM2M server; and send a LwM2M notification as one of a confirmable LwM2M messages or a non-confirmable LwM2M message according to the default confirmable or non-confirmable setting in the server object associated with the LwM2M server.

3. The LwM2M client computing device of claim 2, wherein the LwM2M client computing device is an Internet of Things device.

4. A non-transitory processor-readable medium having stored thereon processor-executable instructions configured to cause a processor of a Lightweight Machine-to-Machine (LwM2M) client computing device to perform operations comprising:

receiving a server object associated with a LwM2M server, wherein the server object associated with the LwM2M server includes a default confirmable or non-confirmable setting that overrides a confirmable or non-confirmable mode of the LwM2M client computing device for communication with the LwM2M server; and sending a LwM2M notification as one of a confirmable LwM2M messages or a non-confirmable LwM2M message according to the default confirmable or non-confirmable setting in the server object associated with the LwM2M server.

5. A Lightweight Machine-to-Machine (LwM2M) client computing device, comprising:

means for receiving a server object associated with a LwM2M server, wherein the server object associated with the LwM2M server includes a default confirmable or non-confirmable setting that overrides a confirmable or non-confirmable mode of the LwM2M client computing device for communication with the LwM2M server; and means for sending a LwM2M notification as one of a confirmable LwM2M messages or a non-confirmable LwM2M message according to the default confirmable or non-confirmable setting in the server object associated with the LwM2M server.

* * * * *